(12) United States Patent
Ma et al.

(10) Patent No.: US 8,160,371 B2
(45) Date of Patent: Apr. 17, 2012

(54) SYSTEM FOR FINDING ARCHIVED OBJECTS IN VIDEO DATA

(75) Inventors: Yunqian Ma, Roseville, MN (US); Ben A. Miller, Minneapolis, MN (US); Andrew H. Johnson, New Brighton, MN (US); Thomas R. Markham, Fridley, MN (US)

(73) Assignee: Honeywell International Inc., Morristown, NJ (US)

( * ) Notice: Subject to any disclaimer, the term of this patent is extended or adjusted under 35 U.S.C. 154(b) by 1169 days.

(21) Appl. No.: 11/949,519

(22) Filed: Dec. 3, 2007

(65) Prior Publication Data

US 2009/0141993 A1 Jun. 4, 2009

(51) Int. Cl.
G06K 9/00 (2006.01)
G06K 9/70 (2006.01)
G06K 9/60 (2006.01)
(52) U.S. Cl. .......................... 382/226; 382/103; 382/305
(58) Field of Classification Search .................. 382/103, 382/107, 108, 173, 206, 232, 276, 293, 305, 382/236; 345/16, 3.2, 721, 719, 328, 432, 345/427, 430; 348/155, 335, 584, 700; 375/240.16
See application file for complete search history.

(56) References Cited

U.S. PATENT DOCUMENTS

| 7,058,205 | B2 * | 6/2006 | Jepson et al. | 382/103 |
| 7,369,682 | B2 * | 5/2008 | Yang et al. | 382/103 |
| 2003/0108220 | A1 * | 6/2003 | Jepson et al. | 382/103 |
| 2006/0245624 | A1 * | 11/2006 | Gallagher et al. | 382/118 |
| 2006/0274949 | A1 * | 12/2006 | Gallagher et al. | 382/228 |
| 2008/0002856 | A1 * | 1/2008 | Ma et al. | 382/103 |
| 2008/0123968 | A1 * | 5/2008 | Nevatia et al. | 382/228 |
| 2008/0181453 | A1 * | 7/2008 | Xu et al. | 382/103 |
| 2009/0110236 | A1 * | 4/2009 | Huang et al. | 382/103 |

OTHER PUBLICATIONS

Ramanan et al, Tracking People by Learning Their Appearance, IEEE Transactions on Pattern Analysis and Machine Intelligence, Vol. 29, No. 1, January 2007.*
Leibe et al, Efficient clustering and matching for object class recognition, Proceedings of British Machine Vision Conference in Proceedings of British Machine Vision Conference (2006) Key: citeulike:3014153.*
Deva Ramanan, D. A. Forsyth, Andrew Zisserman, "Strike a Pose: Tracking People by Finding Stylized Poses," cvpr, vol. 1, pp. 271-278, 2005 IEEE Computer Society Conference on Computer Vision and Pattern Recognition (CVPR'05)—vol. 1, 2005.*
Balan, A.O.; Black, M.J.; , "An Adaptive Appearance Model Approach for Model-based Articulated Object Tracking," Computer Vision and Pattern Recognition, 2006 IEEE Computer Society Conference on , vol. 1, no., pp. 758-765, Jun. 17-22, 2006.*
Marcos M Campos, Gail A Carpenter, S-TREE: self-organizing trees for data clustering and online vector quantization, Neural Networks, vol. 14, Issues 4-5, May 2001, pp. 505-525.*

* cited by examiner

Primary Examiner — Andrae S Allison
(74) Attorney, Agent, or Firm — Schwegman, Lundberg & Woessner, P.A.

(57) ABSTRACT

A system includes a motion detection processor, a motion tracking processor, a people detection processor, a controller, a fusion processor, an appearance model generator processor, a database, a fast search processor, and a matching processor. The motion detection processor, the motion tracking processor, the controller, the people detection processor, the fusion processor, and the appearance model generator processor comprise an analytics pipeline, and the database and the fast search processor comprise a data index pipeline.

3 Claims, 6 Drawing Sheets

SYSTEM FOR FINDING ARCHIVED OBJECTS IN VIDEO DATA

TECHNICAL FIELD

Various embodiments relate to the analysis of video data, and in an embodiment, but not by way of limitation, to identification of archived objects in video data.

BACKGROUND

The detection of persons or objects in video data normally involves the use of some sort of video sensing device, a motion detector, a motion tracker, an object or people detector, and an appearance model generator. Many technological advances have been made in connection with such systems in recent years, but such systems still suffer from a slow response time due to the extensive processing required to analyze video data.

DETAILED DESCRIPTION

Figure 1A:
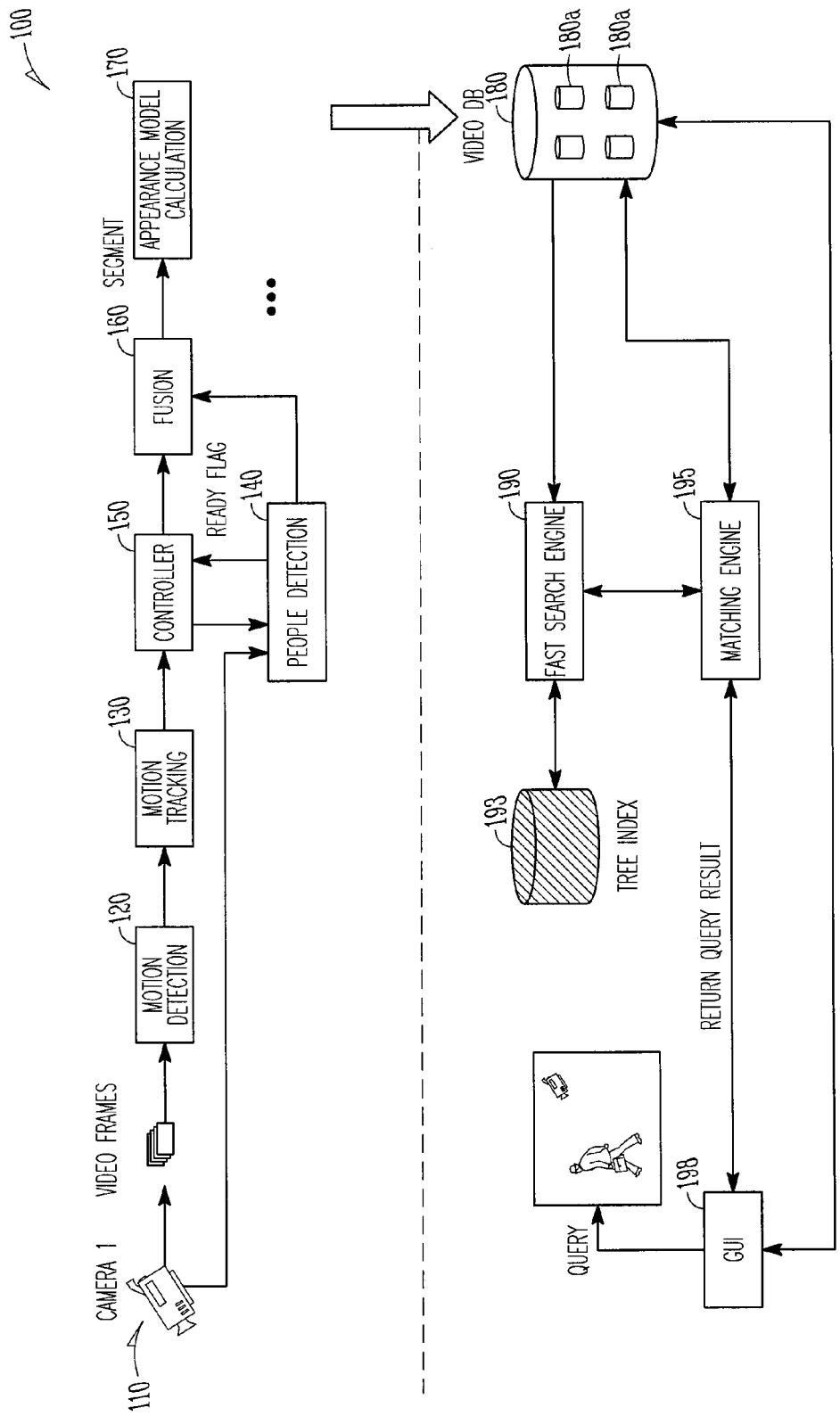
FIG. 1A illustrates a block diagram of an example system to find archived objects in video data.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Embodiments of the invention include features, methods or processes embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.)).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include digital/analog signal processing systems, software, data processing hardware, data processing system-implemented methods, and various processing operations, further described herein. As used herein, the term processor means one or more processors, and one or more particular processors, such as a motion detection processor and a motion tracking processor, can be embodied on one or more processors.

One or more figures show block diagrams of systems and apparatus of embodiments of the invention. One or more figures show flow diagrams illustrating systems and apparatus for such embodiments. The operations of the one or more flow diagrams will be described with references to the systems/apparatuses shown in the one or more block diagrams. However, it should be understood that the operations of the one or more flow diagrams could be performed by embodiments of systems and apparatus other than those discussed with reference to the one or more block diagrams, and embodiments discussed with reference to the systems/apparatus could perform operations different than those discussed with reference to the one or more flow diagrams.

Large video infrastructures often involve thousands of cameras (for example, at airports and casinos). During a forensic analysis, the operators are overwhelmed by the amount of data that have to be analyzed in a rather short period of time (e.g., during a checkpoint breach in an airport). This patent application discloses a video query by example system with fast search capabilities for a large video surveillance infrastructure (i.e., searches based on objects, people, and/or vehicles in the scene) that provides an operator with the ability to search for similar objects of interest, or to track the whereabouts of a subject of interest, over a large facility over long time periods.

In a video query by example system, there are many cameras, including overlapping field of view cameras and non-overlapping field of view cameras. The user can provide an instance of an object of interest to the 'video query by example' system, then the system will return some images or tracks of that object in a reasonable time. The interested object can be a person, a vehicle, etc.

There are three major components for the disclosed video query by example system: the first is a video analytics component, which can include motion detection, object detection (people detection is used as an example of object detection here) and tracking. The second is an appearance model, which is invariant to scaling, lighting conditions to associate object in the same camera, or in the different cameras. The third component is a searching and matching engine that returns the query results.

The video analytics component of the proposed video query by example system can be a motion detection function only, that is, the appearance model can be calculated on the segmented moving regions, and the search and matching functions work on the related appearance model.

The video analytics component of the proposed video query by example system can also be a people detection function only, that is, the appearance model can be calculated on the segmented regions, and the search and matching functions work on the related appearance model. The video analytics component of the proposed video query by example system can be extended to a motion detection function and tracking function, that is, the appearance model can be calculated on the segmented regions estimated by motion detection and tracking, and the search and matching function can work on the related appearance model. The video analytics component of the proposed video query by example system can be extended to a people detection and tracking function only, that is, the appearance model can be calculated on the segmented regions estimated by the people detection function and tracking, and the search and matching function work on the related appearance model. The video analytics component and the proposed video query by example system can be extended to use all the motion detection, people detection, and tracking functions as shown in FIG. 1A. As related to storage on the appearance model, it can be as simple as in memory only, or it can be a tree-based index in the memory and appearance models stored in a database.

Figure 1B:
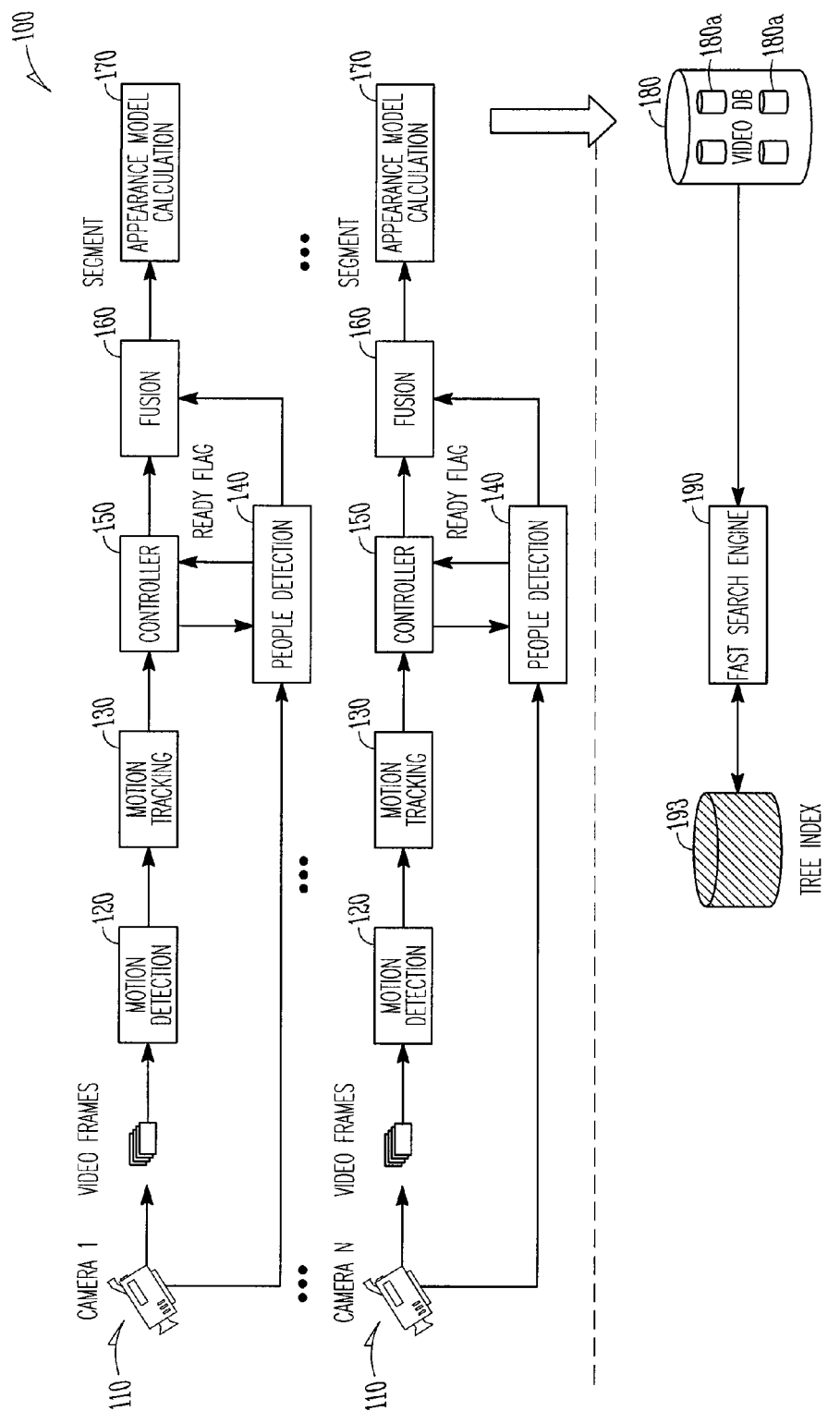
FIG. 1B illustrates an example analytic pipeline of the example system of FIG. 1A.
Figure 1C:
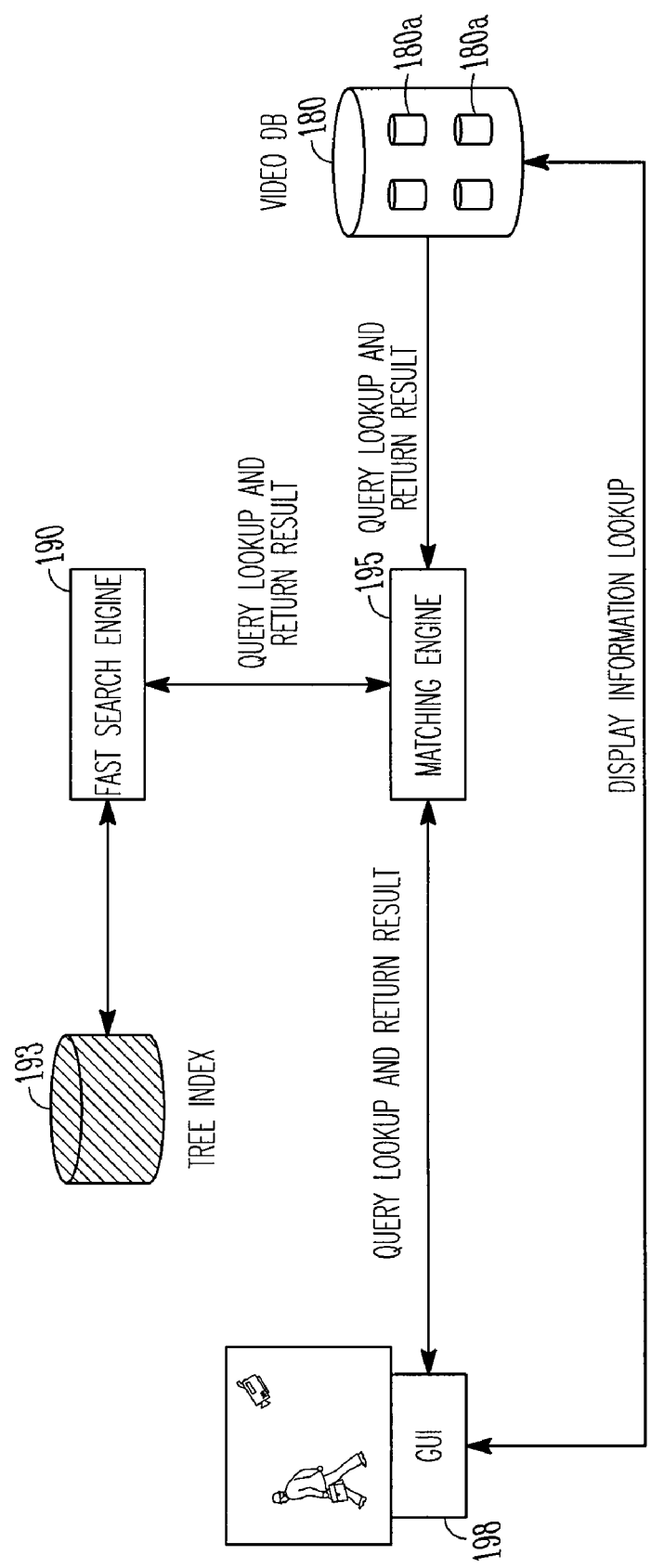
FIG. 1C illustrates an example data index pipeline of the example system of FIG. 1B.

FIGS. 1A, 1B, and 1C illustrate in block diagram form an example embodiment of a system for video query by example. In an embodiment, the system 100 is configured such that a motion detection processor 120, a motion tracking processor 130, a controller 150, a people detection processor 140, a fusion processor 160, and an appearance model generator processor 170 form an analytics pipeline. A graphical illustration of an example embodiment of an analytics pipeline is illustrated in FIGS. 1A and 1B. In another embodiment, the system 100 is configured such that the database 180 and the fast search processor 190 form a data index pipeline. A graphical illustration of an example embodiment of a data index pipeline is illustrated in FIG. 1C. FIG. 1C further illustrates that the database 180 can be a distributed database including a plurality of databases 180a. An embodiment can include both an analytics pipeline and a data index pipeline. As an example, the analytics pipeline analyzes incoming video data from the camera 110, detects motion via the motion detection processor 120, tracks that motion via the motion tracking processor 140, and detects people in the video data via the people detection processor 140. An appearance model including a plurality of features of the detected person is generated by the appearance model generator processor 170, and the appearance model is stored in the database 180. As an example, the data index pipeline includes the database 180 that further includes a balanced tree or an unbalanced tree. These trees can serve as an index of the video data in the database 180. The formation of the balanced tree is based on a median distance between features of an appearance model, and the formation of the unbalanced tree is based on clustering of the features of an appearance model. In an embodiment, the system 100 is configured so that the tree-based index receives data from the database 180 to build a tree-based fast search structure. The tree-based data structure can be a binary tree, a quadtree, etc. For each object, there is an index such as an object ID and its appearance model related to image features. The index (object ID) is stored in the tree based data structure, and the appearance model is stored in the database. The fast search processor 190 is configured to search the tree based data structure. The traverse through a tree (e.g. binary tree) by the search processor 190 is more efficient and faster than a linear search of a typical storage. For example, the time complexity of tree based search can be O(log(n)) vs. O(n) for a linear search, where n is the number of objects stored.

Figure 2A:
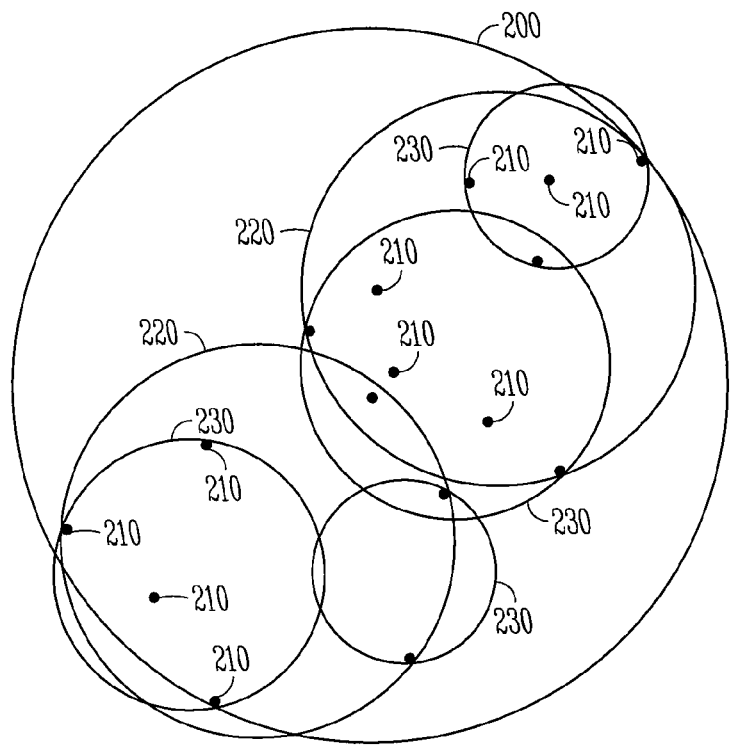
FIG. 2A illustrates in graphical form an example of building a balanced tree.
Figure 2B:
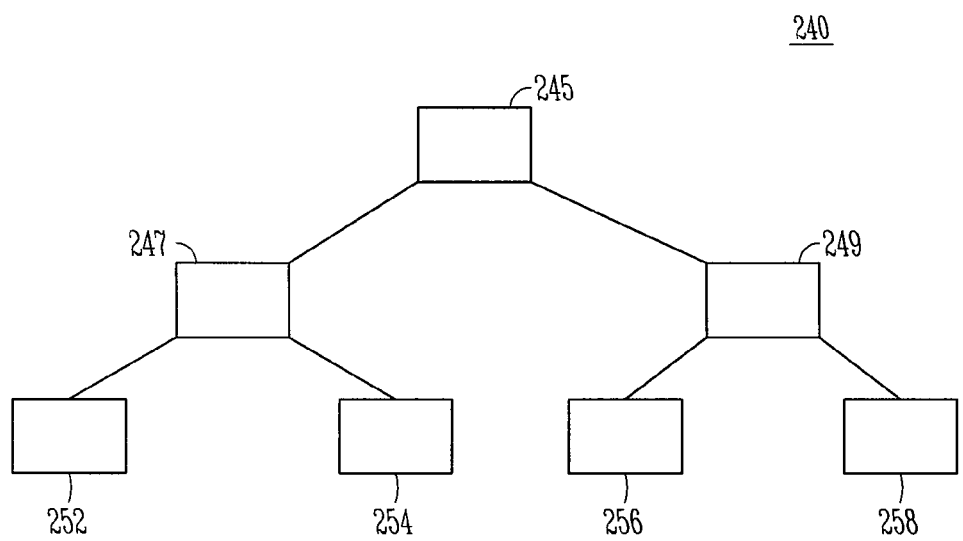
FIG. 2B illustrates an example of a balanced tree.

FIGS. 2A and 2B illustrate in graphical form an example process of building a binary tree. A binary tree is used as an example, however, the tree data structure can be a quadtree as well. The circle 200 in FIG. 2A contains a plurality of data points 210 that represent appearance models of all of the objects. The circle 200 in FIG. 2A corresponds to the root node 245 in the tree based data structure in FIG. 2B. Then there is a partition on group 200 into two groups. These two groups can be represented by the two circles 220 in FIG. 2A. These two groups represented by the two circles 220 are a left child node 247 and a right child node 249 in the tree based data structure in FIG. 2B. The appearance models are divided again in each space (220), as represented by the four circles 230 in FIG. 2A. These four circles 230 correspond to leaf nodes 252, 254, 256 and 258. A tree based data structure can then be constructed as in FIG. 2B. There can be many levels on this tree based data structure. Here FIG. 2A and corresponding FIG. 2B show a three level tree as an example. There are two phases related to the tree data structure: one is building the tree and the other is searching the tree. Building the tree is related to how to partition a particular space into subspaces, for which any available method can be used.

The search phase using the tree based structure is now described. The tree 240 includes a root node 245 that includes all the appearance models, a left child 247 that contains half of the appearance models, and a right child 249 that includes the other half of the appearance models. The search starts from the root node, then the search will go to either left child or right child of the root node. This process continues until the search reaches a leaf node which in the example of FIG. 2B includes children 252, 254, 256, and 258. Each leaf node can be a single object or a small set of objects. There are two approaches to returning the results of a query: the first one consists of returning all the objects in the leaf node, the second one could, for example, return only the best matches among the objects in the leaf node. For a binary tree data structure, the time complexity of the search is O(log (n)), where n is the number of objects. It is apparent that an O(log (n)) search is faster than a linear search O(n) on the objects.

The system 100 of FIGS. 1A and 1B in an embodiment can include a plurality of cameras or other video sensing devices 110. In such an embodiment, each such video sensing device 110 can be coupled to its own dedicated analytics pipeline. Each dedicated analytics pipeline can then be coupled to the data index pipeline. Such a configuration enables the system 100 to record appearance models of persons or other objects in the database 180 faster than other configurations. Then, the balanced and unbalanced tree structures enable the fast search processor 190 to search those appearance models at a faster rate than other system configurations. The overall result then is that the system 100 provides a close to real time analysis of one or more areas that are monitored by the system 100. That is, a person can be identified in near real time, and the identification of where that person has been in the areas covered by the system 100 can be determined in near real time.

The system 100 of FIGS. 1A and 1B can in an embodiment include several fast search processors 190. The search of the appearance models in the database 180 and/or the distributed databases 180a can then be distributed over the several processors, thereby contributing to the speed in which the search can be accomplished.

The user interface 198 can permit a user to select a person in an image frame. This selection can occur in real time from a live video feed, or the person or object can be selected from a stored sequence of video data in the database 180. Upon selection of a person or object, the fast search processor 190 can query the tree-based fast search structure a plurality of times to locate appearance models that are similar to the selected person or object.

The matching processor 195 can receive the similar appearance models identified by the fast search processor 190 and determine if the selected person or object is present in the database 180. The matching processor 195 may also use extra information in determining if the selected person or object is present in the database 180. The tracking information provided by the motion tracking 130 may be used to further group the similar appearance models identified by the fast search processor 190 in order to improve confidence of the results. The matching processor 195 could also incorporate timing information and video sensor layout to reduce false positive results from the fast search processor 190.

In an embodiment, the controller 150 in the analytics pipeline is configured to accept input from one or more of the motion detection processor 120 and the motion tracking processor 130, and is further configured to asynchronously accept input from one or more of the people detection processor 140 and provide output to the fusion processor 160. The controller processor 150 can be further configured to provide a most current image frame to the people detection processor 140 upon receiving the request for an image frame from the people detection processor 140.

Figure 3:
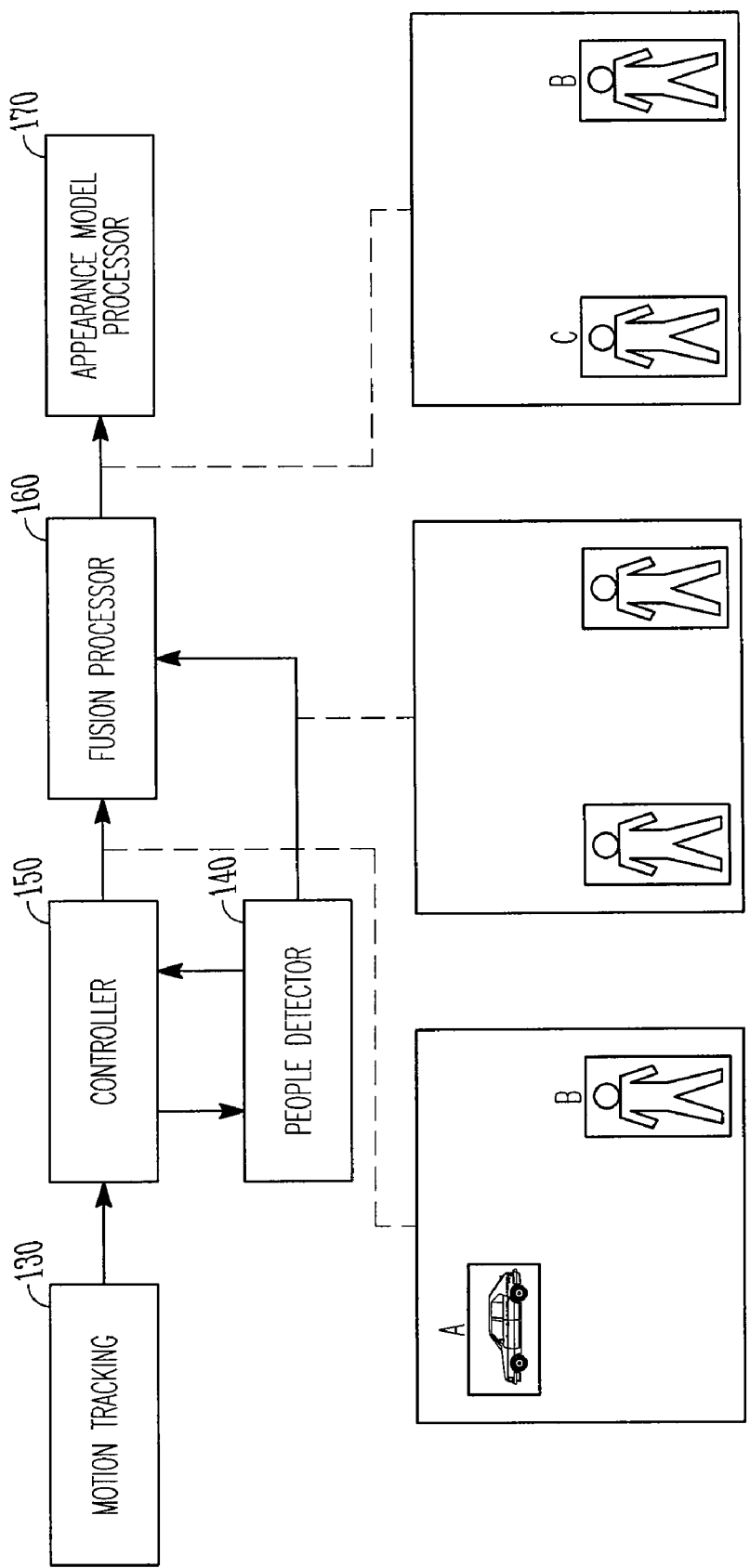
FIG. 3 illustrates an example of a fusion processor.

In an embodiment, the fusion processor 160 is configured to remove an object located by the motion tracking processor 130 when the people detection processor 140 finds no person near the object, to transmit a message to the appearance model generator processor 170 when a person is found by the people detection processor 140 even when there is no corresponding object found by the motion detection processor 120, and to combine an object and a person when the person is near the object. FIG. 3 shows an example of the fusion processor. The fusion processor 160 receives two objects from the controller labeled A and B. It also receives two people detected by the people detection processor 140 for the same frame. The fusion processor 160 then uses available information such as detection confidence and spatial information to determine if a person is the same as the object labeled B. It also determines whether an object labeled A is not detected by the people detection processor 140 so it is not passed to the appearance model processor 170. Finally the other person detected is assigned a new label C and passed to the appearance model processor 170. This allows the system 100 to record and detect people even if they are not moving by using the people detection processor 140.

In another embodiment, the controller processor 150 is configured to transmit data resulting from processing an image frame to the fusion processor 160 when there is no request from the people detection processor 140. The fusion processor 160 can be configured to transmit an image frame to the appearance model generator processor 170 when the fusion processor 160 is not waiting on a result of the people detection processor 140. This embodiment allows the system to include analytic processors such as the people detection processor 140 which processes in an asynchronous manner the various video streams without forcing the entire system to perform at the slowest processing rate. This is important in the video data processing due to the wide range of processing time required for different analytic processors. For example many motion detection processors 120 and motion tracking processors 130 process at real time (30 frames per second) or higher. However processes such as the people detection processor 140 tend to process video streams at slower rates but give more detailed information about the objects in the video data. Through the asynchronous connection of various processors, the system 100 is able to leverage the more detailed information without sacrificing overall processing rate or information about objects which appear very briefly in the video data.

Figure 4:
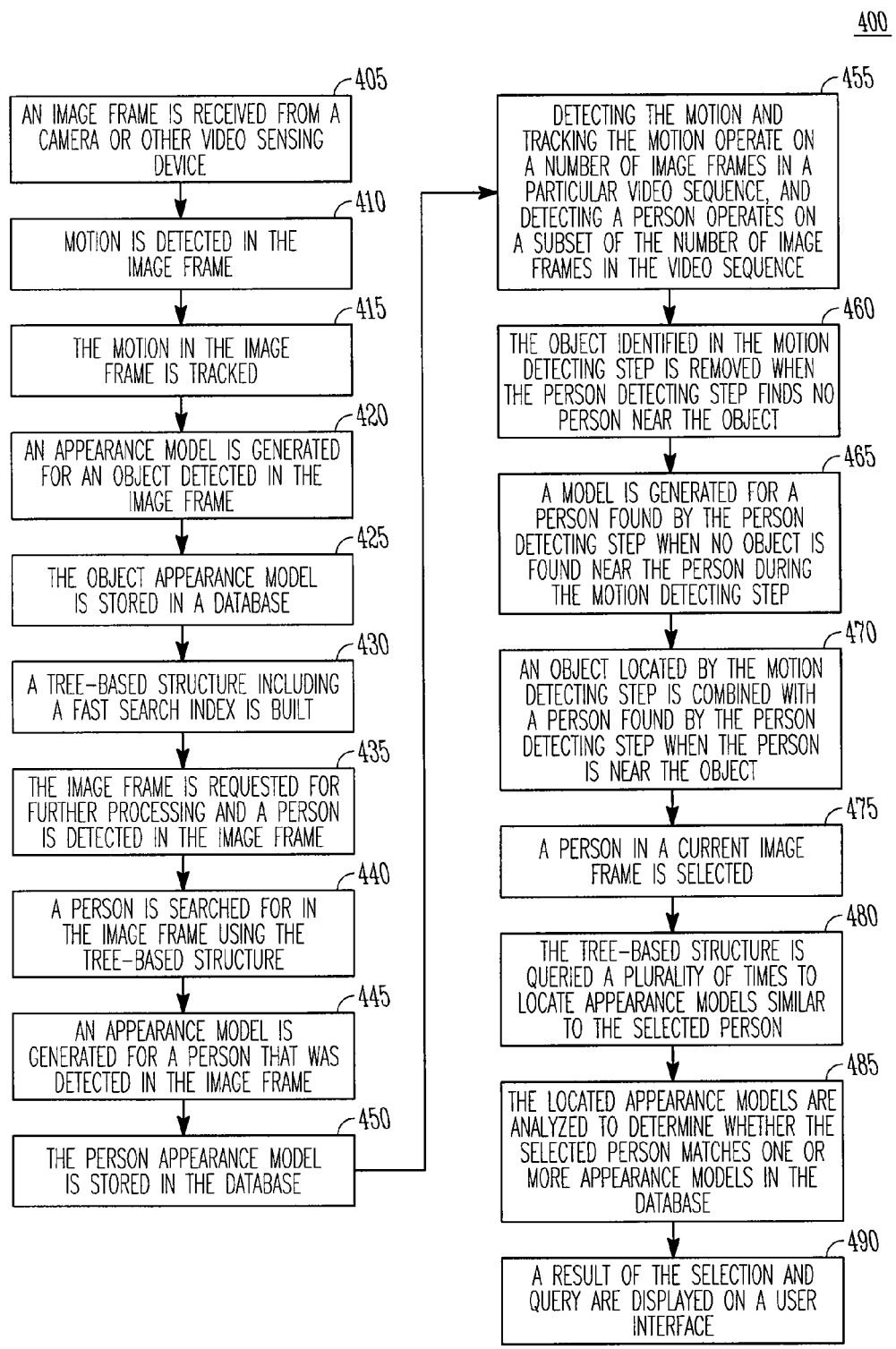
FIG. 4 illustrates an example embodiment of a process to find archived objects in video data.

FIG. 4 is a flowchart of an example process 400 for finding archived objects in a video database. FIG. 4 includes a number of process blocks 405-490. Though arranged serially in the example of FIG. 4, other examples may reorder the blocks, omit one or more blocks, and/or execute two or more blocks in parallel using multiple processors or a single processor organized as two or more virtual machines or subprocessors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

At 405, an image frame is received from a camera or other video sensing device. At 410, motion is detected in the image frame. At 415, the motion in the image frame is tracked. At 420, an appearance model is generated for an object detected in the image frame. At 425, the object appearance model is stored in a database. At 430, a tree-based structure including a fast search index is built. At 435, the image frame is requested for further processing and a person is detected in the image frame. At 437, an appearance model for a person that was detected (or queried) in the image frame is generated. At 440, the queried person's appearance model is searched for in the database. As indicated at 455, detecting the motion and tracking the motion operate on a number of image frames in a particular video sequence, and detecting a person operates on a subset of the number of image frames in the video sequence.

FIG. 4 further illustrates at 460 that the object identified in the motion detecting step is removed when the person detecting step finds no person near the object. At 465, a model is generated for a person found by the person detecting step even when no object is found near the person during the motion detecting step. At 470, an object located by the motion detecting step is combined with a person found by the person detecting step when the person is near the object.

At 475, a person in a current image frame is selected. At 480, the tree-based structure is queried a plurality of times to locate appearance models similar to the selected person. At 485, the located appearance models are analyzed to determine whether the selected person matches one or more appearance models in the database. At 490, a result of the selection and query are displayed on a user interface.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate example embodiment.

The invention claimed is:

1. A non-transitory computer readable medium comprising instructions that when executed by a processor execute a process comprising:
  receiving an image frame from a video sensing device;
  detecting motion in the image frame;
  tracking the motion in the image frame;
  generating an appearance model for an object detected in the image frame;
  storing the object appearance model in a database;
  building a tree-based structure including a fast search index, wherein the tree-based structure comprises one or more of a balanced tree and an unbalanced tree, wherein the balanced tree is based on a median distance between features of the object appearance model, and the unbalanced tree is based on clustering of features of the object appearance model;
  requesting the image frame and detecting a person in the image frame;
  generating an appearance model for a person detected in the image frame; and
  searching a queried person's appearance model in the image frame using the tree-based structure;
  wherein detecting the motion and tracking the motion operate on a number of image frames in a video sequence, and detecting a person operates on a subset of the number of image frames in the video sequence.

2. The non-transitory computer readable medium of claim 1, wherein the object appearance model and the person appearance model are indexed in the tree-based structure.

3. The non-transitory computer readable medium of claim 1, comprising instructions for:
  selecting a person in a current image frame;
  querying the tree-based structure a plurality of times to locate appearance models similar to the selected person;
  analyzing the located appearance models to determine whether the selected person matches one or more appearance models in the database; and
  displaying a result on a user interface.

* * * * *